Patented Jan. 26, 1932

1,842,720

UNITED STATES PATENT OFFICE

BENJAMIN R. HARRIS, OF CHICAGO, ILLINOIS

METHOD OF PREVENTING DISCOLORATION OF VEGETABLES

No Drawing.     Application filed June 11, 1928.  Serial No. 284,667.

My invention relates to a process for preventing discoloration of vegetables or fruits when exposed to the air, and also an improved product resulting from the process. The process has its greatest utility in preserving the natural color of comminuted vegetables or fruits after they are exposed to atmospheric oxygen. By means of my invention an improved comminuted product may be obtained, a specific example of which is a prepared horse-radish adapted for use as a condiment, and preserving over a very long period of time its original natural color.

It is a well known fact that when certain vegetables and fruits, for example, potatoes or horse-radish root, are ground to pulp, they very quickly turn black and apparently unfit for domestic consumption. The discoloration begins on the outside of the product but very quickly proceeds to the interior and in course of time the entire product becomes discolored. Although the discoloration per se does not render the product inedible, it is obviously very desirable that such discoloration be prevented.

The cause of this discoloration is known to be due to the presence of certain oxidizing enzymes which are normally present in the vegetable tissue, and when such tissue becomes bruised in the grinding process these enzymes are brought into intimate contact with oxidizable substances with the result that oxidization occurs with the accompanying discoloration.

The principal object of my invention is to prevent this discoloration.

Another object is to inactivate the oxidizing enzymes to prevent their having this effect.

Another object is to introduce into the comminuted vegetable or fruit an anti-catalyst adapted to counteract the harmful effect of the enzymes.

Another object is to produce a comminuted vegetable or fruit product which will not discolor when exposed to the air.

Another object is the production of a condiment having as its main constituent, horse-radish root which will maintain its natural color when exposed to the air.

My discovery consists primarily in the process of treating comminuted vegetable or fruit with an anti-catalyst which renders the oxidizing enzymes inactive by either paralyzing them or diminishing their activity. As a result of the process, the product will retain its natural or original color although in a macerated or ground condition for a long period of time, and the other properties of the material including the keeping qualities, taste, or the like, will remain unaffected.

A material which I employ as an anti-catalyst with satisfactory results, is a small amount of sulphurous acid or a salt of sulphurous acid, which will liberate sulphurous acid in an acid medium. I have also found that I can use a soluble thio-sulphate such as sodium thio-sulphate in an acid medium, although the latter must be used in larger proportion than the sulphite.

A very satisfactory sulphurous acid salt for my purpose, is sodium acid sulphite and this is added preferably in a quantity insufficient to bleach the product but in sufficient quantity to protect the product against discoloring for a great length of time. I may employ also with the sodium acid sulphite a substantially equivalent amount of hydrogen peroxide which reacts with the sodium acid sulphite to change it to sulphate. When the hydrogen peroxide is used, the resulting product, although not containing any free sodium sulphite or sulphurous acid will keep in good condition, as to color, for a much greater length of time than the original ground product not so treated. Of course the hydrogen peroxide is added after the sulphur dioxide salt has been allowed to act on the oxidizing enzymes of the vegetable tissues to reduce their activity, for example 15 or 20 minutes. A longer period of time may be allowed to elapse, however, depending upon the state of subdivision of the vegetable tissues or other factors which may have an effect upon the activity of the sulphur dioxide salt.

As an instance of the use of my process, I take horse-radish root and peel it and grind it in a convenient manner and finally add sufficient vinegar to prevent fermentation; sugar and salt and other materials such as cream, may be added if desired. A small quantity of sodium acid sulphite is added and the resulting condiment is ready for use or may be bottled and offered for retail sale where it will maintain its original color for a great length of time.

In carrying out the above process, a very good horse-radish condiment has been obtained when the proportions of the various materials have been regulated in accordance with a certain formula. This illustrative formula comprises 40 lbs. of the ground horse-radish root, 3 lbs. of salt, 5 lbs. of sugar, 50 lbs. of vinegar (5% strength), and from .5 to .7 oz. of sodium acid sulphite, or even .8 oz. if desired. The mixture is well stirred to distribute the acid sulphite throughout the batch, and cream may be incorporated with the above mixture if desired, the proportions varying according to the character desired in the product.

While normally the amount of sodium acid sulphite for the best results will run between .03% and .05%, nevertheless I do not limit myself to any particular amount of sodium acid sulphite, as I have found that I can greatly improve the keeping qualities of ground prepared horse-radish by using as low as .01% of sodium acid sulphite and the resulting product will keep considerably longer without discoloring than the product which is not so treated.

Although sodium acid sulphite is an edible anti-catalyst, there might be times when it would be desired to avoid the presence of free sulphurous acid in the product, in which case a small amount of hydrogen peroxide may be added as described above. This step of the process may be included in the production of the product resulting from the use of the formula outlined above.

In the case of potatoes, it is known that discoloration takes place almost immediately and for this reason it is very difficult to handle raw potatoes after they have been exposed to the air. I have found, however, that a potato batter consisting of ground potato pulp may be prevented from being discolored by the addition of from .02 to .04% of sodium acid sulphite. The batter so treated will maintain its normal color for several hours and even overnight. In fact it may be kept a much longer period of time but putrefaction will set in induced by the presence of the bacterial organisms. The sodium acid sulphite is used in sufficient quantity to act as an anti-catalyst but in no sense will this small quantity thereof affect the product bacteriologically.

I am aware that sulphur dioxide has been used heretofore in connection with food products in order to bleach them. For example, it has been used to bleach dried or cured fruits such as figs, pears, apples, etc.; also, with ground meat in order to increase the color intensity to make it appear redder when exposed to air; in this case as an oxygen carrier in order to make it appear red. It has also been used in appreciable quantities as a preservative against bacterial action. In that case, a very large portion of the sulphurous acid must be used. I use sulphur dioxide for an entirely different purpose and in an entirely different manner. I propose the use of the sulphur dioxide and its derivatives in very minute quantities on ground or comminuted vegetable material, not on the surface of vegetable or fruit and in a quantity not sufficient to bleach but in a quantity sufficient to act as an anti-catalyst to reduce or paralyze or poison the oxidizing enzymes present in the vegetable tissue, so as to minimize discoloration.

My theory is that the acid sulphite acts as an anti-catalyst, reducing or destroying or paralyzing or poisoning the oxidase or peroxidase or the oxidizing enzyme, which causes discoloration, so that even when the anti-catalyst itself, in this case sodium acid sulphite, is destroyed or rendered ineffective by the addition of a chemical equivalent of hydrogen peroxide, the original oxidase or peroxidase remains inactivated and for that reason, discoloration does not set in.

I do not limit myself to the use of sodium acid sulphite. Sulphur dioxide or any soluble salt of a sulphur oxygen acid, capable of liberating sulphur dioxide in acid solution, may be used to poison and reduce the activity of the oxidizing enzymes present in vegetable tissues, which are capable of causing discoloration.

The amount of anti-catalyst necessary to inactivate the oxidizing enzymes in vegetable tissues such as horse-radish and potatoes is very small. The amount preferably used is insufficient in itself to perform bleaching of the product or preserving it bacteriologically. In the case of horse-radish and similar vegetable tissues, such as ground potatoes, which contain oxidizing enzymes, the addition of a trace of sodium acid sulphite or its equivalent acts as an anti-catalyst diminishing the activity of the oxidizing enzymes and thus reducing discoloration or darkening of the product.

Although the above outlined theory would appear to be correct, I do not confine myself to any process which depends for its result on the correctness of this theory.

I have not adapted my process for use with every vegetable and fruit but there is every logical reason for believing that any vegetable or fruit which contains enzymes which operate to discolor the vegetable or fruit may be treated by my process. In the claims where the term "comminuted vegetable or fruit" is employed it is meant to include edible articles of vegetable origin in their natural unpreserved state in counter-distinction to articles such as meats or the like which are of animal origin.

It is probable that other materials besides those outlined may have the effect described and accordingly I do not restrict myself to the use of any particular materials and the invention is limited only by the scope of the appended claims.

What I claim as new and desire to secure by United States Letters Patent is:—

1. As a new article of manufacture, a prepared horse-radish composition, including comminuted horse-radish root, sufficient vinegar to preserve the horseradish root bacteriologically, and sulphur dioxide in sufficient quantities to retard the action of the oxidizing enzymes, but insufficient to effect bacteriological preservation of the comminuted horse-radish root itself.

2. As a new article of manufacture, a prepared horse-radish composition, including comminuted horse-radish root, sufficient vinegar to preserve the horseradish root bacteriologically, and not more than .02% sulphur dioxide in combination as a salt.

3. As a new article of manufacture, a prepared hose-radish composition, including comminuted horse-radish root 40 parts, salt 3 parts, sugar 5 parts, vinegar (5% strength) 50 parts as a bacteriological preservative, and not more than .02% of sulphur dioxide in combination as a salt.

4. As a new article of manufacture, a prepared horse-radish composition, including comminuted horse-radish root, sufficient vinegar to preserve the horseradish root bacteriologically, sodium acid sulphite, and hydrogen peroxide, the sulphite being present in sufficient quantities to retard the action of the oxidizing enzymes, but insufficient to effect bacteriological preservation of the horseradish root itself.

5. As a new article of manufacture, a prepared horse-radish composition including comminuted horseradish root, an agent for preserving the horseradish root bacteriologically, and sulphur dioxide in sufficient quantities to retard the action of oxidizing enzymes, but insufficient to affect the product bacteriologically.

In witness whereof, I hereunto subscribe my name this 7th day of May, 1928.

BENJAMIN R. HARRIS.